United States Patent [19]
Gest

[11] Patent Number: 4,824,714
[45] Date of Patent: Apr. 25, 1989

[54] MOLDED COMPOSITE PANELS

[75] Inventor: Rene Gest, Rantigny, France

[73] Assignee: Isover Saint-Gobain c/o Saint-Gobain Recherche, Courbevoie, France

[21] Appl. No.: 137,815

[22] Filed: Dec. 24, 1987

[30] Foreign Application Priority Data

Dec. 24, 1986 [FR] France .................... 86 18183

[51] Int. Cl.⁴ .................... B32B 1/04; B32B 3/02; B32B 5/14; B32B 31/00
[52] U.S. Cl. .................... 428/156; 156/62.2; 156/222; 156/258; 156/267; 425/298; 428/157; 428/159; 428/161; 428/171
[58] Field of Search .................... 156/62.2, 222, 258, 156/267; 425/298; 428/156, 157, 158, 159, 160, 161, 162, 170, 171, 172

[56] References Cited
U.S. PATENT DOCUMENTS 4,327,049 4/1982 Miller .................... 425/298
4,474,840 10/1984 Adams .................... 428/157

Primary Examiner—William J. Van Balen
Attorney, Agent, or Firm—Oblon, Fisher, Spivak, McClelland & Maier

[57] ABSTRACT

A composite panel molded between a male stamping part and a female stamping part, and comprising a layer of mineral fibers having on selected zones particularly edges which are of three times the density which is normal in the panel, a surfacing layer destroyed under the action of the heat released by a knife above the said selected zones and a surfacing layer which covers the said selected zones, and a process for making the same are disclosed.

The composite panel is used particularly as an inner trim for a motor vehicle.

17 Claims, 3 Drawing Sheets

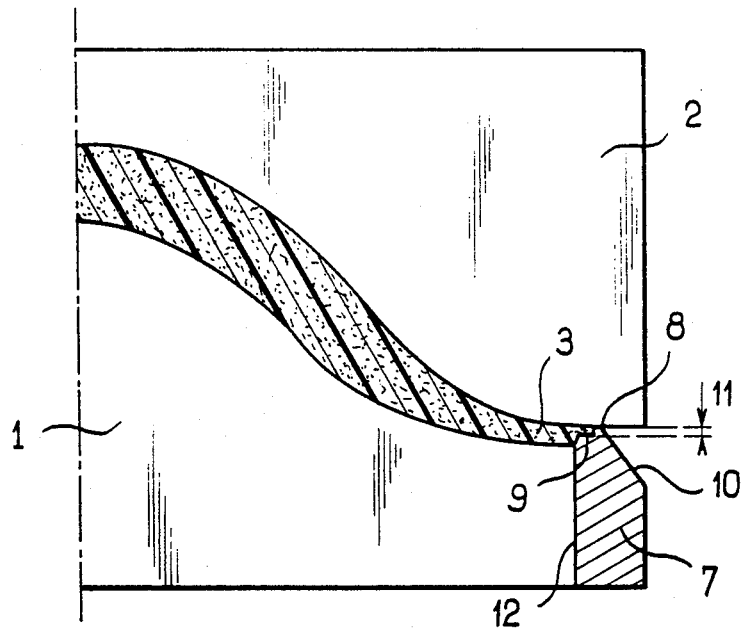
FIG_1A
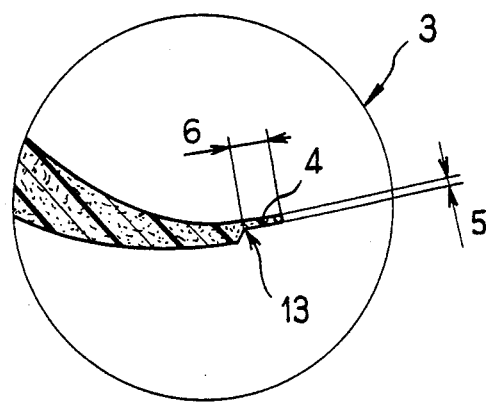
FIG_1B

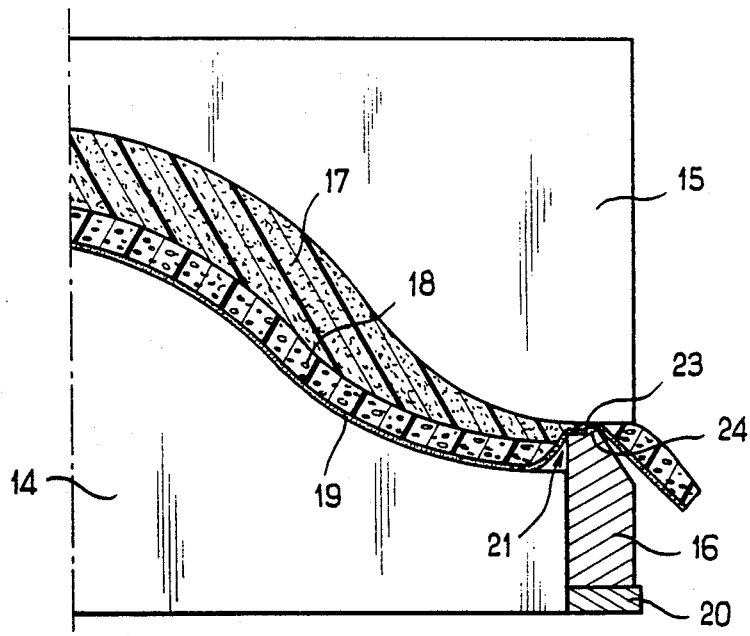
FIG_2A
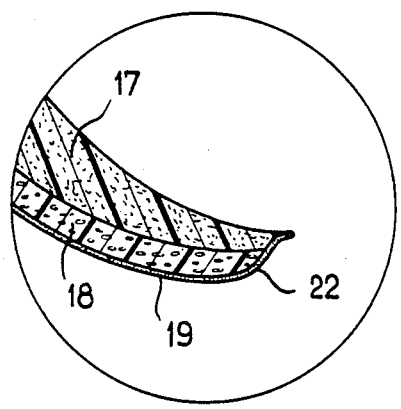
FIG_2B

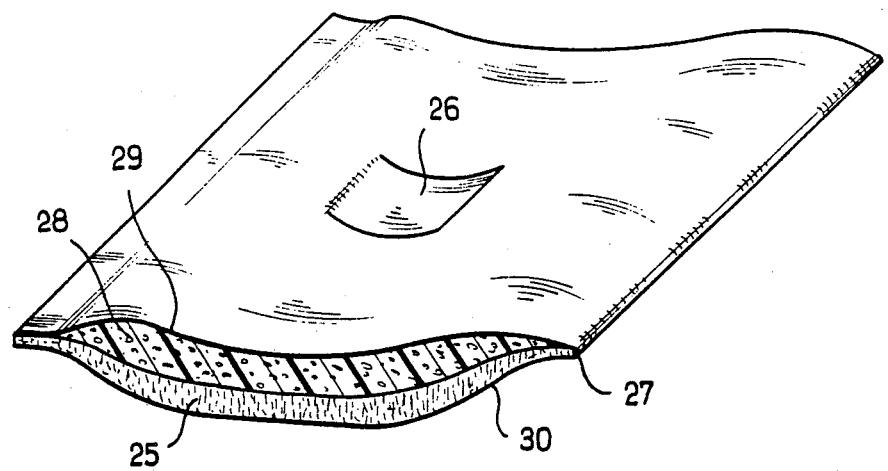
FIG_3
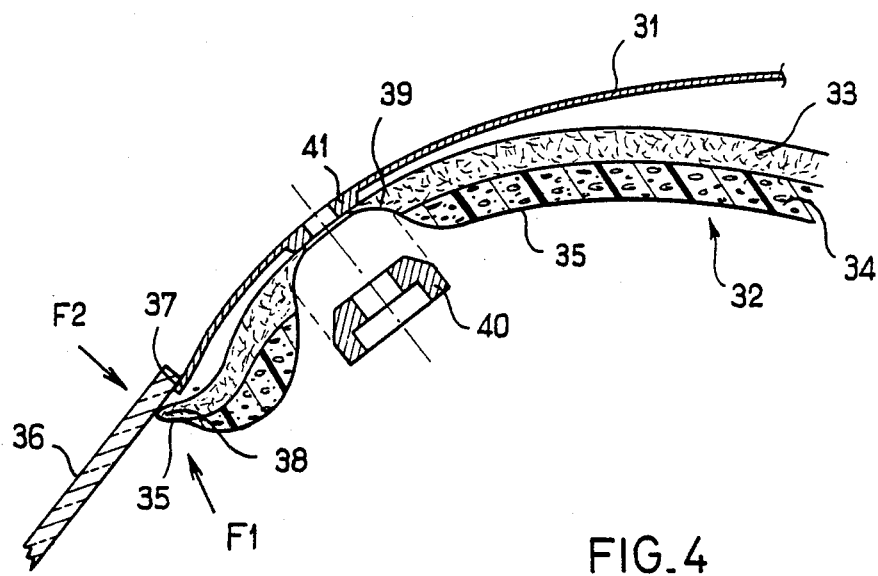
FIG_4

MOLDED COMPOSITE PANELS

BACKGROUND OF THE INVENTION

1. Field of the Invention

The invention relates to molded composite panels formed from a layer of mineral fibers, a surfacing layer of synthetic foam, and, optionally, a surfacing film to provide a desired appearance of, for example, a woven fabric.

2. Discussion of the Background

Composite panels which can be used particularly as interior headlinings for motor vehicles are generally made of a layer of bonded mineral fibers and a surfacing layer, for example of synthetic foam. The surfacing layer serves as a layer to be glued to a woven fabric covering layer. A sheet of non-woven material may likewise be glued onto the layer of mineral fibers, on the surface opposite the finishing layer and not visible after assembly. This sheet protects the mineral fibers during the various operations needed for positioning the finished product.

Such panels are preferably made by a so-called single-pass process described in Inventors' European Patent Applications EP Nos. 0 112 210 and EPO 124 387 (=U.S. Pat. No. 4,609,519). In this process a mat of mineral fibers, particularly non-bonded mineral fibers, is impregnated with a hot polymerizing resin, preferably by spraying, after which it is cut into portions of desired lengths. An intermediate layer of, for example, synthetic foam and a covering appearance-imparting layer is then stacked on each portion, with interposed films of suitable adhesives. The assembly constitutes an original product which is hot pressed in order to polymerize the resin which bonds the mineral fibers and which also activates the films of adhesive substances.

Generally, the press consists of a mold and a counter-mold. The shapes of this mold and counter-mold are such that the composite panel has thinner portions, particularly around the edge and possibly on any areas which subsequently have to be recessed. This is envisaged, for instance, for the accommodation of a cailing lamp.

Since the basic product is of a constant thickness, these thinner portions have greater density which improves the rigidity of the composite panel, facilitates assembly operations, and in particular facilitates any drilling needed for assembly. Furthermore, thinned edges make it possible for the composite panel to be fitted without a frame, leaving the edge visible.

This type of installation is more particularly desirable if the vehicle has flush fitting windows, which are simply glued into place and which are therefore not surrounded by frames which mask the front edge of the headlining. Likewise, the recessed zones have to have very clean edges to allow edge-to-edge fixing without any framing.

One limitation of the single-pass process described above is that such clean and thinned edges can only be obtained by using intermediate layers of small thickness. If the molding is carried out at a high temperature so that the mold and counter-mold are at temperatures exceeding 180° C., for example, then the intermediate layer of synthetic foam is completely deteriorated by the heat and then only serves as an underlayer to assist gluing of the covering fabric. This gluing underlayer is quite advantageous because it imparts to the product an excellent surface condition but it can be readily appreciated that it is pointless to have thick underlayers which would in any case be reduced to the thickness of a film after the surfacing.

On the other hand, if the molding operation is carried out at a relatively low temperature, particularly with a temperature of, for instance, around 150° C, especially for the counter-mold which is in contact with the surfacing sheet, then the films of adhesive will be activated but this will not cause the covering fabric to shine nor will there be any thermal degradation of the synthetic foam. But in this case, the intermediate layer of foam is only provisionally compressed and, once the molding operation ceases, it resumes its initial thickness.

The composite panel therefore comprises portions which are easily made thinner by reason of the final compression of the layer of mineral fibers but from an aesthetic point of view, the inefficiency of these thinned portions is obvious for composite panels of which the nominal thickness is, for instance, 13 mm, distributed between 5 mm of mineral fibers and 8 mm of synthetic foam, while over the thinned portions this thickness is still 10 mm, distributed between 2 mm of mineral fibers and 8 mm of synthetic foam.

Such thicknesses of synthetic foam are, however, desirable because they give the sensation of a soft touch, a touch which is even more pleasant if a velour type cloth is, for example, used as the surfacing sheet. The inventors have therefore suggested making composite panels which comprise a surfacing layer of synthetic foam 3 to 10 mm in thickness and having thinned rigid portions which are of a clearly defined thickness and which are essential to satisfactory positioning of the headlining and accessories, for example a roof light or a grab handle.

It is also known to produce composite panels by two-pass molding processes. In these processes the first pass is a molding to shape the layer of mineral fibers. The second is a surfacing of this molded layer of mineral fibers, that is to say the gluing-on of the surfacing layer and possibly of the finishing appearance sheet. Molding can then be carried out at a very high temperature, for example approximately 250° C.

This permits of complete and very rapid polymerization of the resin binding the mineral fibers while the surfacing is carried out at 120° C., for example, avoiding any damage to the surfacing layer which is, for instance, of synthetic foam or of the finishing appearance layer which is, for example, a woven fabric.

The insert, that is to say the layer of mineral fibers of the form obtained after the first phase of the process, preferably has thin edges. This thinning of the edges is achieved very easily by appropriate shaping of the mold and of the counter-mold, corresponding to localized increases in the pressure forces exerted and the creation of areas of greater density. In practice, the thinned edges have a thickness of around 1.5 mm. Lesser thicknesses require a considerable increase in the closure pressure applied to the mold. This increase, on the one hand, entails technological difficulties, and, on the other, may lead to the onset of crumbling of the edges due to deterioration of the mineral fibers.

This two-pass process makes it possible to obtain an insert having thin edges which are slightly wider than those obtained by a single-pass process but it does not resolve the problem posed by thick surfacing layers which resume their volume once the panel has emerged from the press. Furthermore, the surfacing layer and the covering sheet are cut larger than the insert to avoid excessively meticulous centering and therefore they overlap the insert.

The simplest answer to this situation is to make a clean cut around the surfaced insert, leaving the edge to reveal both the very dense layer of mineral fibers and the layer of foam and additionally the surfacing sheet. This elementary embodiment results in a product which is fairly unattractive, which has insufficiently thin edges, and which may deteriorate rapidly if the layer of foam remains exposed.

On the other hand, more aesthetic edges are obtained after an edging process. In this case, the composite panel is partially cut out in order to achieve a clean edge over the insert part of the panel and then the intermediate layer and the surfacing sheet are folded back over to the back of the composite panel. Therefore, the edge too is covered with a surfacing fabric and can therefore be left visible. Unfortunately, once the intermediate layer assumes a thickness of 3 to 4 mm, panels are obtained which have on the edges beads of around 1 cm thickness, which are more or less compressible and which are not suitable for a headlining installation.

There is therefore a need for a solution to the above discussed problems in the art of making composite panels which can be used as interior headlinings for motor vehicles.

SUMMARY OF THE INVENTION

Accordingly, it is an object of this invention to provide a composite panel, and a process for making the same. This panel has at least one layer of mineral fibers bonded by a thermosetting resin and at least one surfacing layer of a non-compressible material which is thermodegradable under the polymerization temperature of the resin.

It is another object of this invention to provide a composite panel, and a process for making the same, wherein the composite panel has chosen portions which are rigid.

It is another object of this invention to provide a composite panel, and a process for making the same, wherein the composite panel has edges which are thin.

It is another object of this invention to provide a composite panel, and a process for making the same, wherein the composite panel has edges which are rigid.

The inventors have now discovered a novel composite panel, and a process for making the same, which satisfies all of these objects and other objects which will become apparent from the description of the invention given hereinbelow.

The composite panel provided by the present invention is made up of a molded layer of mineral fibers, preferably glass fibers, bonded by a thermosetting resin and a surfacing layer of a noncompressible material which is degraded at the optimum temperatures for polymerization of the resin. This composite panel is characterized in that the molded layer of mineral fibers has chosen zones, particularly around the edge of the composite panel, having a density which is at least three times the nominal density of the mineral fiber layer outside these selected zones. These chosen zones have a thickness which is at least equal to one-third the nominal thickness of the layer of mineral fibers. And the surfacing layer in this panel is at least partially destroyed by thermal disintegration over the said selected zones.

The process for obtaining the composite panel provided by this invention is a molding process which employs a two-pass press-forming operation.

BRIEF DESCRIPTION OF THE DRAWINGS

A more complete appreciation of this invention and many of its attendant advantages will be readily obtained as the same becomes better understood by reference to the following detailed description when considered in connection with the accompanying figures wherein:

FIG. 1 shows a basic diagram illustrating the molding of an insert (1A) having a thinned portion on an edge (B);

FIG. 2 shows a basic diagram illustrating the surface of an insert (2A) finished by a woven fabric glued onto a thick foam (2B);

FIG. 3 is an example of a composite panel according to the present invention; and FIG. 4 is a diagram showing the assembly of a composite panel used as a headlining for a motor vehicle and produced in accordance with the present invention.

DETAILED DESCRIPTION OF THE PREFERRED EMBODIMENTS

Preferably, the composite panel is covered with a finishing appearance layer glued to the surfacing layer and covering the selected zone. Furthermore, when the selected zones of the composite panel form an edge of the panel, the finishing layer adheres to the mineral fiber edge. The finishing layer is advantageously a woven fabric.

Preferably, the surfacing layer is made of a polyester-polyurethane synthetic foam of a thickness less than 10 cm and the density of which is between 30 and 75 kg/cu.m, being preferably equal to 35 kg/cu.m. Thicknesses comprised between 3 and 8 mm are more particularly preferred, the composite panel then being very pleasant to touch. A very pleasant finish is obtained if the synthetic foam layer is associated with a woven fabric, for example of the velour type.

It is likewise possible to use as a surfacing layer heavy polyvinyl chloride based layers, generally with a talc filling and having a surface mass of between 3000 and 7000 g/sq.m and a thickness between 3 and 6 mm. This provides sound insulation if the composite panel is placed, for example, under the dashboard, between the engine and the interior of the motor vehicle, generally in the case of a heavy goods vehicle.

To facilitate handling of the composite panel and avoid the fibers becoming detached therefrom, the layer of mineral fibers is preferably covered on its bare surface by a sheet of non-woven textile fibers.

Another object of the invention is a method of obtaining composite panels comprising at least one molded layer of mineral fibers bonded with a resin and a thermosetting surfacing layer of a non-compressible material which disintegrates in the range of temperatures required to polymerize the thermosetting resin and comprising at least one thinner portion which is denser than the rest of the composite panel. Any known resin can be used to bind the mineral fibers. For example one may use urea-formaldehyde resins, phenol-formaldehyde resins which can either be unmodified or modified, or melanine-formol or formophenolic resins can be used. The method is a molding process employing two-pass press-forming.

During the first pass, an insert is formed which corresponds to a layer of mineral fibers from a section having a constant thickness of a possibly prebonded mineral fiber felt impregnated with a thermosetting resin placed between a mold and a counter-mold of complementary shape, in the position of closure and heated to above 200° C., preferably to about 250° C. This is a temperature which is optimum for rapid and complete polymerization of the thermosetting resin. During this first pass, the thinner and denser portions are subjected to a pressure of between 3 and 7 kg/sq.mm.

In the second pass, the insert is coated with a heat-activated glue which can be any heat-activated glue used in this area of technology. For example, this glue can be a plastic film having a thickness of 25 to 50 μm. The film can be made of PVC and can optionally be perforated. Alternatively polyethylene or polypropylene granules can be used. The surfacing layer is placed on top, cut to dimensions larger than those of the insert and the whole assembly is subjected to a further pressing between a mold and a counter-mold identical to those of the first pass. This mold and counter-mold are maintained in the position of closure but slightly more apart to allow for the thickness of the surfacing layer. They are heated to a temperature between 100° and 150° C., preferably close to 120° C., to activate the glue without damaging the surface layer. At the same time and in accordance with a particularly important characteristic of the invention, the thinner and more rigid portions are subjected to a temperature above 200° C. and preferably of around 250° C. and to a pressure of between 10 and 20 kg/sq.mm.

In the thinner and more rigid portions, the surfacing layer is disintegrated under the effect of the heat and pressure so that the composite panel then only has the thickness of the thin layer of mineral fibers whereas its nominal thickness is that of the layer of mineral fibers plus that of the interposed layer. If the thinner and more rigid portions are situated at the periphery of the composite panel, the pressure and the temperature are such that the surfacing layer which extends beyond the layer of mineral fibers is cut off.

If the composite panel has likewise to comprise a finishing or surfacing layer, the latter is superimposed on the surface layer prior to the second press-forming pass, possibly with provision for coating with glue if an already preformed surface layer-finishing coating assembly is not used. Such an assembly can be of the type comprising a woven fabric on a synthetic foam. In the case of thinned portions situated around the periphery of the panel, as the finishing coating is generally very fine and relatively heat-resistant, and additional pressure of 10 to 20 kg/sq.mm has to be applied around the composite panel to ensure cutting and sealing of the edges.

This method may be carried out by means of a twin-plate pressing apparatus, the plates being opposite each other, one carrying a male die while the other carries a female die of complementary shape. Both plates are heated by a heatbearing medium and maintained apart in the position of closure, by abutments. The apparatus is then provided with a tool rigid with one of the plates, and provided with a heating means adapted to maintain it at a temperature in excess of 200° C.

This tool is in the form of a rectangular trapezium. Its base which is not adjacent to the right-angle is provided with a ridge at a right-angle to the base. At the end of this ridge is a cutting edge if the tool is also to be used for cutting and sealing the edges.

During the first press-forming pass, the tool quite considerably compresses the selected portions of the insert which, after molding, match the contours of the tool very accurately. In the second press-forming pass, the heat and the pressure imparted by the tool are such that the entire surface layer glued onto the selected portions is destroyed. The covering sheet consequently exactly matches the contours of the insert and its thin portions. Since, moreover, the ridge provided on the tool bounds the edge of the insert for the thinned portions situated at the edge of the composite panel, the covering sheet is likewise closely fitted against this edge and the result is a panel having edges which are surfaced and sealed and which have a very satisfactory appearance.

Referring now to the figures, wherein like reference numerals designate identical or corresponding parts throughout the several views, and more particularly to FIG. 1 thereof, FIG. 1A shows in longitudinal section and very diagrammatically a press for molding a composite panel which comprises a male die 1 mounted on a fixed frame, not shown here, and a female die 2, mounted on a vertically movable plate, likewise not shown. The male die 1 and the female die 2 have complementary shapes adapted to the final shape which it is desired that the composite panel should have. Passing through them is a heat carrying fluid which provides uniform heating to an elevated temperature, for instance equal to 250° C., this temperature likewise being obtainable by electric heating.

In the position of closure, as shown here, the mold 1 and counter-mold 2 are maintained slightly apart by means of abutments in order very accurately to monitor the thickness of the molded insert.

As shown in FIG. 1B, the insert has localized portions of reduced thickness 3, obtained directly by pressing between the male die 1 and the female die 2 and the thickness of which is at most equal to one-third the nominal thickness of the insert. These localized portions of reduced thickness extend into very thin sealing fields 4 in which, for instance, perforations will be made prior to fitting of the composite panel. These sealing fields 4 are at least three times more dense and thinner than the rest of the insert. For an insert 5 mm thick, a preferred thickness 5 for the sealing field according to the invention is comprised between 0.8 and 1 mm. For aesthetic reasons, it is indeed desirable for the thickness of the sealing field to be as fine as possible. However, the pressure needed increases quite rapidly as the thickness diminishes. And on the other hand excessively fine fields have a tendency to crumble so that it is not desirable to work with sealing fields of a thickness less than 15% the nominal thickness of the insert.

This sealing field is, during the course of the press-forming process subjected to a pressure of between 3 and 7 kg/sq.mm. Thus, for a composite panel of 5 m periphery, comprising all round it a sealing field of a width 6 equal to 5 mm, a press is needed which will deliver something like 20 tons of pressure. Therefore, widths 6 of more than 5 mm are not advisable because they require far more powerful tooling than the equipment normally used for the production of glass fiber based composite panels. On the other hand, with more than 1.5 mm, it becomes difficult to make perforations for assembly purposes and furthermore the surfacing and finished layers may possibly become detached from the insert. In practice, a sealing field of more than 2.5 mm and of less than 3 mm is entirely satisfactory.

The molding pressure and the profile of the selected zones of the insert are obtained by virtue of using the integral tool of the male die 1 which has the form of a rectangular trapezium provided with a ridge 8 at right-angles to the base 9 and extending into a trailing edge 10. The height 11 of the ridge 8 determines the thickness 5 of the sealing field 4, while the length of the base 9 determines the width of the sealing field 4. The height 11 of the trapezium bears on the counter-mold 2 and causes a clearly marked angle 13 to be formed on the insert.

This tool 7 is preferably machined from a block of steel of a nominal 110 kg/sq.m and is provided with heating elements adapted to raise it to a temperature close to 250° C., for example.

Once the insert is molded, the surfacing operation shown diagrammatically in FIG. 2A is performed. The press is similar to the press used for molding the insert, the plates of the male die 14 and of the female die 15 being this time traversed by a heat bearing fluid the temperature of which is between 100° and 150° C. A tool or cutter 16 is used for shaping the thinned portions of the composite panel. If necessary, for this second pass, it is possible to use the same press as was used for the first pass, but the tool 16 then has to be keyed and the thermostat must be made to show the new temperature required.

Between the plates 14 and 15 are placed the insert 17, a surfacing layer 18, in this case of synthetic foam, and a finishing sheet 19, in this case a woven fabric, to allow for the additional thicknesses introduced, spacers to keep apart the male die 14 and female die 15 are provided and are taller than hitherto. Thus, in the thin zones of the insert 17, a compensating key or wedge 20 is provided so that the knife 16—similar to the tool 7—abuts the female die 15 once the press has been closed.

The knife 16 is maintained at a temperature close to 250° C. which causes disintegration of the surfacing layer 18 which consists of a heat sensitive material. The radiant heat likewise partly destroys the surface layer situated close to the knife 16, in the zone 21. Therefore, the composite panel has a quite attractive rounded edge 22.

The sharp edge of the composite panel conforms to the profile of the cutter 16 and is entirely covered by the finishing sheet 19 which is cut flush with the panel by a cutting edge 23, preferably of 5 to 10 mm, carried by the ridge 24 on the cutter 16. This cut-out is made by applying a pressure of between 20 and 40 kg/sq.mm along the cutting line in the case of a woven fabric, while a pressure of 10 to 20 kg is sufficient outside the cutting line.

FIG. 3 shows an example of a composite panel produced according to the invention. The panel comprises a mineral fiber layer 25 which forms the insert and which is obtained from a portion of mineral fiber felt, preferably a felt of bare or presurfaced glass fibers with a mass per area of surface of 750 to 1500 g/sq.m, while the binder content is between 14 and 20% by weight. As the polymerizing time of the resin at 250° C. is between 30 seconds and 1 minute, a suitable binder is, for example, a urea-modified resol type of resin which has a molecular ratio of formaldehyde to phenol of around 3, catalyzed in a basic medium and neutralized.

After molding, the insert has a nominal thickness of 7 to 14 mm, with thinned portions 26 and 27 of 1.5 mm.

This insert preferably has on its back a layer 30 of non-woven material which is applied to the portion of felt before the first pressforming pass.

The surface layer 28, glued onto a polyester fabric 29 serving as a finishing sheet, is of polyurethane-polyester foam 6 mm thick in the composition of which there is 69% by weight of a polyol-polyester compound and 27% isocyanate. The gross density of the foam is 35 kg/cu.m, the net density being greater than 32 kg/cu.m.

In addition to the synthetic foams quoted, other materials may be used for the surface layer, such as heavy filled latex based rubbers or, more economically, polyvinyl chloride based materials with a talc based filling, for instance. For the soundproofing of heavy goods vehicles, it is more particularly appropriate to use a surface layer having a density of between 1500 and 2000 kg/cu.m, in other words a surface mass rating of 2000 to 7500 g/sq.m for a thickness of between 1 and 4 cm. In this case, the surfacing process is identical to that described except that generally speaking the panels do not have a finishing sheet for appearance purposes and therefore the additional pressure needed for cutting out is unnecessary.

Finally, the tools according to the invention may also be used for the production of composite panels which comprise only a mineral fiber layer surfaces with a material which does not have to withstand high temperatures, such as a fine film of polyvinyl chloride 0.3 to 0.4 mm thick or a woven fabric, the color of which fades under heat, such materials being coated with a suitable glue.

The composite panel has its edges 27 sealed, covered by the woven fabric 29 and has hollow portions 26 where the foam 28 has been destroyed under heat but which are still covered by the woven fabric 29.

FIG. 4 shows how advantageous such a form of composite panel is when used as a headlining for a motor vehicle. Shown here is the front part of the metal sheet 31 which forms the roof of a motor vehicle, insulated and sound-proofed by a composite panel 32 comprising a layer of mineral fibers 33, a surface layer 34 of foam and an appearance-imparting covering sheet 35. According to a conventional manner of installation, the windscreen 36 of the vehicle is at 37 flush with the metal sheet 31. Therefore, the front edge 38 of the composite panel 32 is visible from the inside of the vehicle (arrow F1) and from the outside of the vehicle through the glass (arrow F2). The thinned edge 38, covered by the cloth 35, contributes to the aesthetic appearance of the vehicle. The composite panel 32 likewise has a central thinned portion 39 which permits the fixing of an accessory 40 by a clip or a nut 41 fixed on the metal plate 31.

Thus, a composite panel according to the invention makes it possible to provide both improved comfort for the passengers of the vehicle by providing quality insulation and using original surface finishes which completely match the rest of the trim in the vehicle and which offer simplified fitting of accessories and of the composite panel itself.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composite panel comprising:
   (1) a molded layer of mineral fibers bonded by a thermosetting resin, and
   (2) a surface layer of a non-compressible material which disintegrates at the optimum polymerization temperatures appropriate to said thermosetting resin;
   wherein said molded layer of mineral fibers comprises selected zones having a density which is at least three times the nominal density of the layer of mineral fibers outside these selected zones, wherein said selected zones have a thickness which is at least equal to one-third the nominal thickness of the layer of mineral fibers, and wherein said surface layer is at least partially destroyed by disintegration under heat over said selected zones.

2. The composite panel of claim 1, wherein said molded layer of mineral fibers comprises glass fibers.

3. The composite panel of claim 1, wherein said selected zones are located at the edge of said composite panel.

4. The composite panel of claim 1, wherein said molded layer of mineral fibers comprises glass fibers and wherein said selected zones are located at the edge of said composite panel.

5. The composite panel of claim 1, wherein said surface layer has glued to it an appearance-imparting surface finishing layer which covers said mineral fiber layer over said selected zones and the edge thereof, when said selected zones are situated at the edge of said composite panel.

6. The composite panel of claim 1, wherein said surface layer is made of a synthetic polyester-polyurethane foam having a thickness of less than 10 cm and having a density which is between 30 and 75 kg/cu.m.

7. The composite panel of claim 6, wherein said density is about 35 kg/cu.m.

8. The composite panel of claim 1, wherein said surface layer is made of filled polyvinyl chloride having a mass per unit of surface area of between 3000 and 7000 g/sq.m.

9. The composite panel of claim 1, wherein said surface layer is a polyvinyl chloride film having a thickness of between 0.3 and 0.4 mm.

10. The composite panel of claim 6, wherein a woven fabric glued onto said surface layer is used as a finishing material.

11. The composite panel of claim 2, wherein said layer of glass fibers has a mass per unit of surface area, excluding binder, of 750 to 1500 g/sq.m, and a binder content of between 14 and 20% by weight.

12. The composite panel of claim 2, wherein said layer of mineral fibers is covered with a sheet of nonwoven textile fibers on its face which is opposite the surfaced face.

13. A process for producing a composite panel comprising at least one layer of mineral fibers and at least one surface layer, comprising:
   a first pass in which an insert is formed which corresponds to said layer of mineral fibers, said unit being prepared from a portion of a mineral felt of mineral fibers, impregnated with a thermosetting resin and placed between a mold and a counter-mold having complementary shapes, maintained slightly apart when in the closed position and heated to a temperature above 200° C. for a length of time sufficient for essentially complete polymerization of said thermosetting resin, wherein said insert has thinner and denser portions which are subjected to a pressure of between 3 and 7 kg/sq.mm; and
   a second pass in which said insert is coated with a heat-activated glued, the surface layer is superposed, cut out to dimensions larger than those of the insert and the whole assembly is subjected to a new pressing operation between a mold and a counter-mold identical to those of the first pass, maintained at a greater distance from each other when in the position of closure, having regard to the thickness of the surface layer, and heated to a temperature of between 100° and 150° C. to activate the glue without damaging the surface layer, the thinner and more rigid portions being simultaneously subjected to a temperature above 200° C. and to a pressure of between 10 and 20 kg/sq.mm.

14. The process of claim 13, wherein said constant thickness mineral felt of mineral fibers comprises prebonded mineral fibers, wherein a temperature of about 250° C. is used in said first pass and a temperature of about 120° C. is used in said second pass.

15. A process of claim 13, wherein a composite panel comprising thin portions on its edges and covered with a surface finishing sheet is obtained by applying a pressure of 20 to 40 kg/sq.mm around the edge of the panel, along the cutting line.

16. A pressing apparatus for carrying out a process for producing a composite panel comprising at least one layer of mineral fibers and at one surface layer, wherein said process comprises (1) a first pass in which an insert is formed which correspond to said layer of mineral fibers, said insert being prepared from a portion of a constant thickness mineral felt of mineral fibers, impregnated with a thermosetting resin and placed between a mold and a counter-mold having complementary shapes, maintained slightly apart when in the closed position and heated to a temperature above 200° C. for a length of time sufficient for essentially complete polymerization of said thermosetting resin, wherein said insert has thinner and denser portions which are subjected to a pressure of between 3 and 7 kg/sq.mm.; and (2) a second pass in which said insert is coated with a heat-activated glued, the surface layer is superposed, cut out to dimensions larger than those of the insert and the whole assembly is subjected to a new pressing operation between a mold and a counter-mold identical to those of the first pass, maintained at a greater distance from each other when in the position of closure, having regard to the thickness of the surface layer, and heated to a temperature of between 100° and 150° C. to activate the glue without damaging the surface layer, the thinner and more rigid portions being simultaneously subjected to a temperature above 200° C. and to a pressure of between 10 and 20 kg/sq.mm, wherein said apparatus comprises:
   two plates which face each other, one carrying a mold and the other a half-mold, the mold and half-mold having complementary shapes, heated by a heat bearing fluid and maintained apart by abutments when in the position of closure, said apparatus being also provided with a tool rigid with one of the plates, provided with heating means adapted to maintain it at a temperature above 200° C., this tool being in the shape of a right-angled trapezium, its base not adjacent to the right-angle being provided with a protuberance or ridge extending at a right-angle to the base.

17. The pressing apparatus of claim 16, characterized in that the ridge of protuberance on the tool carries a cutting edge.